(12) United States Patent
Kim et al.

(10) Patent No.: US 6,553,071 B1
(45) Date of Patent: Apr. 22, 2003

(54) MOTION COMPENSATION CODING APPARATUS USING WAVELET TRANSFORMATION AND METHOD THEREOF

(75) Inventors: Jeong Min Kim, Seoul (KR); Young Man Park, Bucheon (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/521,415

(22) Filed: Mar. 8, 2000

(30) Foreign Application Priority Data

Mar. 9, 1999 (KR) .............................. 99-7667

(51) Int. Cl.[7] .............................. H04B 1/66; H04N 7/12; G06K 9/46; G06K 9/36
(52) U.S. Cl. .............................. 375/240.19; 348/398.1; 382/240; 382/281
(58) Field of Search .................... 375/240.19, 240.16, 375/240.11, 240.13, 240.18, 240.09; 348/398.1, 395.1, 402.1, 408.1; 382/240, 238, 249, 246, 248, 281, 232; 704/229; 358/1.9; H04N 7/12, 7/50

(56) References Cited

U.S. PATENT DOCUMENTS

| | | | | | |
|---|---|---|---|---|---|
| 5,412,741 | A | * | 5/1995 | Shapiro | 375/240.11 |
| 5,764,805 | A | * | 6/1998 | Martucci et al. | 382/238 |
| 5,825,935 | A | * | 10/1998 | Murakoshi | 375/240.16 |
| 6,160,846 | A | * | 12/2000 | Chiang et al. | 375/240.05 |
| 6,219,383 | B1 | * | 4/2001 | Park | 375/240.16 |

* cited by examiner

*Primary Examiner*—Gims S. Philippe
(74) *Attorney, Agent, or Firm*—Fleshner & Kim, LLP

(57) ABSTRACT

A motion compensation coding apparatus using a wavelet transformation and a method thereof are capable of detecting a motion vector with respect to a block having a certain change or a motion in an image from a region having a hierarchical structure based on each frequency band and each sub-frequency band generated by wavelet-transforming an inputted motion picture and effectively coding a motion using the detected motion vector. The motion compensation coding apparatus can include a wavelet transformation unit receiving a video signal and wavelet transforming by regions of different frequency bands based on a hierarchical structure, and a motion compensation unit receiving the wavelet-transformed images and compensating the regions having a certain change or motion in the image.

15 Claims, 7 Drawing Sheets

MOTION COMPENSATION CODING APPARATUS USING WAVELET TRANSFORMATION AND METHOD THEREOF

BACKGROUND OF THE INVENTION

1. Field of the Invention

The present invention relates to an apparatus capable of processing a motion picture using a wavelet transformation and a method thereof, and in particular to a motion compensation coding apparatus using a wavelet transformation and a method thereof which are capable of detecting a motion vector with respect to a block having a certain change or a motion in an image from a region having a hierarchical structure based on each frequency band and each sub-frequency band generated by wavelet-transforming an inputted motion picture and effectively coding a motion using the detected motion vector.

2. Description of the Background Art

Recently, a computer communication network is advanced, a data including much data such as a motion picture is transferred through the above-described computer communication network. In order to effectively transfer the above-described data, an advanced motion picture compression coding method and transfer technique are increasingly needed. For example, the Motion Picture Expert Group (MPEG) is one of the standards of the motion picture compression coding method. A known motion picture compression method will be explained.

A motion picture is formed of frames which are changed based on the elapse of time or is formed of video signal sequences. In order to effectively compress the motion picture, a two-dimensional space overlap of an image and a time axis-base overlap must be eliminated.

The two-dimensional space overlap of the image data may be decreased by processing a difference image corresponding to a difference between images based on a DCT (Discrete cosine Transform), and the overlap of the time axis may be decreased by compensating a motion with respect to a block having a motion at a center portion having a largest motion of an object among continuous images with respect to the time axis. Two neighboring images are compared with respect to time, and an image data of a previous image is used for processing the current image with respect to the portion in which there is no change in the image or the portion in which there is a small change in the image, and the portion having a large changes is motion-compensated for thereby significantly decreasing the amount of the image data which will be compressed and transmitted.

Here, a process for searching similar blocks in the previous images and the current images is called as a motion estimation by comparing the images because a change is small between the above-described images. In addition, a displacement of the motion in the blocks is called as a motion vector.

In the image compression method used for the MPEG, the images are compressed by the motion compensated DCT which compensates the motions of the block using only an image signal and a luminance signal in order to eliminate the overlap of the time and space. Namely, in the method for coding the images based on the MPEG, there are an interceding method and an intracoding method. The interceding method is directed to compensating the motion with respect to the inputted image and recovering the image and then obtaining a difference image by subtracting the recovered image from the original image for thereby performing DCT with respect to the difference image and performing the coding operation. In addition, the intracoding is directed to performing DCT and the coding operation without motion-compensating the image having large change and the macro block.

In the method for detecting a change of the image and recovering to the original image with respect to the motion picture compressed by MPEG or Motion JPEG based on the interceding and intracoding operations, there are a method for directly processing the compressed images and a method for fully recovering the compressed images. The method for directly processing the compressed images is capable of decreasing an operation time but the accuracy is decreased. The method for fully recovering the images is capable of accurately detecting the images but the processing speed is slow. Namely, since all image data are searched by comparing the original images having a space overlap by the block unit, the process time is increased.

Recently, in order to overcome the above-described problems and a blocking effect which is a disadvantage of the DCT and a resolution degradation which occurs when increasing the compression rate of the images, the images are compressed and coded using the wavelet based transformation.

Figure 1:
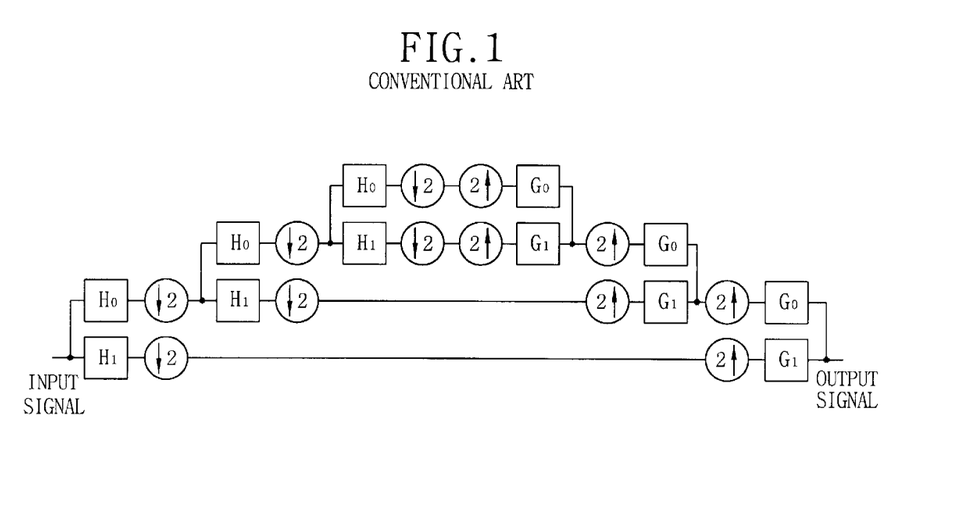
FIG. 1 is a view illustrating the construction of a conventional two-dimensional wavelet transformation.

FIG. 1 is a view illustrating the construction of a Discrete Wavelet Transformation for processing the image signals in the conventional art which includes a wavelet transform coding step(Discrete Wavelet Transformation) for down-sampling the inputted image signal and analyzing into wavelet coefficients, and an inverse wavelet transformation coding step(Inverse Discrete Wavelet Transformation) for up-sampling the down sampled wavelet coefficients and recovering to the original image signal.

The wavelet transformation coding step down-samples the inputted image signals to the signal which is one half of the previous signal using a low frequency analyzing filter H0 and a high frequency analyzing filter H1 and a down-samples the signals to the signals which is one half of the previous signal using the low frequency signal H0 and the high frequency analyzing filter H1 for thereby generating a wavelet transformation coefficient and analyzing the inputted image signal to the down sampled wavelet coefficients.

The inverse wavelet transformation coding step(Inverse Discrete Wavelet Transformation) up-samples the down sampled wavelet transformation coefficients to the signals which is twice the previous signal using a low frequency combining filter G0 and a high frequency combining filter G1 for thereby generating an up-sampled wavelet transformation coefficient and repeatedly performing the up-sampling processes, so that the images are combined to the original images.

Here, since the outputted image signals are processed based on the analyzing filters H0, H1, G0 and G1, the input image signals are delayed and outputted later compared to when the inputted image signals are not processed by the analyzing filters and outputted. However, there is no difference in the contents of the images contained in the input images and output images.

The wavelet transformation method is directed to independently dividing the inputted signals by the band, compressing and coding the same. During the coding operation, the sub-band coding itself hierarchically divides the data into different resolutions and adds and subtracts the signals of the added hierarchies between nodes having different resolutions for thereby using a desired band width.

The inputted video signals is divided into different frequency bands by the band analyzing filter and is divided into frequency bands of two-dimensional space. As the frequency band is increased, the importance of the divided band is decreased during the reproducing operation. Actually, in the case of the image data of the low frequency and, an image having a smoothed boundary of an object is outputted, and in the case of the high frequency band having a high frequency, only vertical boundary, horizontal boundary and diagonal components are outputted based on the frequency band.

Figure 2:
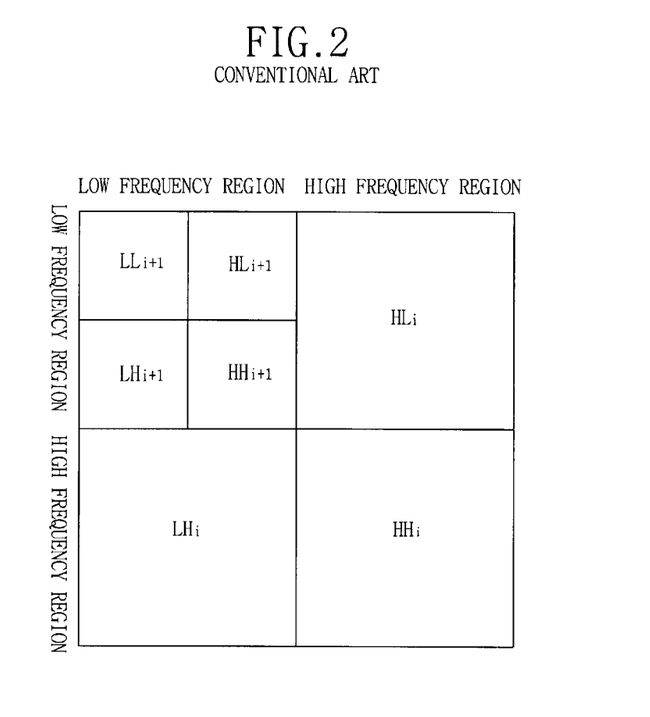
FIG. 2 is a view illustrating a distribution of a frequency dividing band of a conventional wavelet coefficient which is generated by a wavelet transformation.

FIG. 2 is a view illustrating the distribution of a sub-frequency band of a wavelet coefficient which is wavelet-transformed and then generated. The sub-frequency band HLi positioned at the right upper portion represents a high frequency component of the horizontal direction, and the sub-frequency band LHi positioned at the left lower portion represents a high frequency component of the vertical direction, and the sub-frequency band HHi positioned at the right lower portion represents a high frequency component of the diagonal direction. In particular, since the visual ability of a human is weak with respect to the diagonal components, the sub-band region of the diagonal band may be more in detail divided. Namely, the sub-frequency region LLi positioned at the left upper portion is divided into sub-frequency bands HLi+1, LHi+1, HHi+1, LLi+1 in the horizontal, vertical, and diagonal directions. Here, "i" represents the level of the sub-frequency band.

Therefore, as a result of the wavelet transformation of the structure in which the sub-frequency band is divided into sub-frequency bands, the low frequency regions including more data of the video signals which affect a visual ability of human are concentrated at one side, and the high frequency region which includes less data of the video signals is concentrated at another side.

As the above-described compression coding method using the wavelet transformation, there is an EZW (Embedded Zero-tree Wavelet Transformation). The EZW algorithm is a type which converts the coding method using an entropy to the wavelet transformation method.

The above-described conventional techniques are directed to a method for eliminating a two-dimensional space overlap of the image with respect to the still image.

SUMMARY OF THE INVENTION

Accordingly, it is an object of the present invention to provide a motion compensation coding apparatus which is implemented using a wavelet transformation for eliminating a time overlap of an image with respect to a motion picture.

It is another object of the present invention to provide a motion compensation coding method which is implemented using a wavelet transformation for eliminating a time overlap of an image with respect to a motion picture.

It is another object of the present invention to provide a motion compensation coding apparatus using a wavelet transformation capable of searching a boundary band in a corresponding direction at each sub-frequency band with respect to a data of a frequency band generated after performing a wavelet transformation for eliminating a space overlap and extracting the blocks having a motion region by comparing the frames of each image and eliminating the time overlap and performing the coding operation.

To achieve the above-described objects, there is provided a motion compensation coding apparatus which includes a wavelet transformation unit for receiving a video signal and wavelet transforming by the region of different frequency bands based on a hierarchical structure, and a plurality of motion compensation units for receiving the wavelet-transformed images and compensating the regions having a certain change or motion in the image..

To achieve the above-described objects, there is provided a motion compensation coding method which includes a step for wavelet-transforming an inputted image, a step for compensating a region having a motion in the wavelet-transformed image, and a step for entropy-coding in a form for transferring the motion-compensated image.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 3:
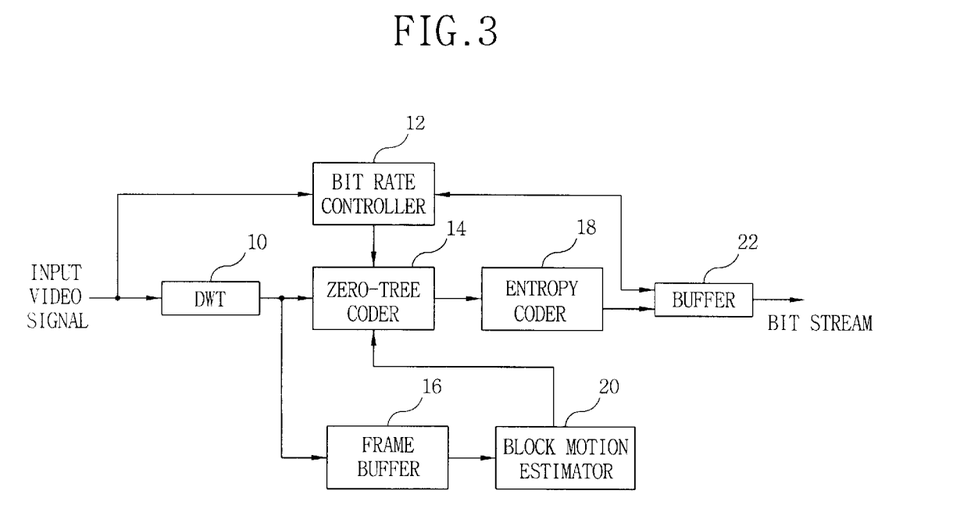
FIG. 3 is a view illustrating the construction of a motion compensation coding apparatus using a wavelet transformation according to the present invention.

FIG. 3 is a view illustrating a motion compensation coding apparatus using a wavelet transformation according to the present invention which includes a wavelet transformation unit 10 for receiving a video signal, dividing the video signal into sub-frequency bands of different hierarchical structures and outputting a wavelet-transformed video, a bit rate controller 12 for outputting a control signal for controlling a quantization rate based on the frame data included in the video signal and the amount of a video signal which will be transmitted to the receiving side, a frame buffer 16 for storing the wavelet-transformed video, a block motion estimator 20 for comparing the front and back frames of the videos stored in the frame buffer 16 and extracting a motion block, a zero tree coder 14 for zero-tree-coding the wavelet-transformed video or a corresponding motion block extracted by the block motion estimator 20, an entropy coder 18 for receiving the zero-tree-coded signal and coding to a proper type for transmitting to the receiving side using a Hoffman method or an arithmetic coding method, and a buffer 22 for storing the signals coded by the entropy coding unit 18 and outputting the coded signal in a bit stream type in accordance with a control of the control signal outputted from the bit rate controller 12.

Here, the frame buffer 16 stores the video signals by the unit of field or frame. The block motion estimator 20 searches a motion vector from the motion block in the motion picture. Namely, the size of the unit block is set to 64×64 bits which has a minimum zero tree coding, and the motion vector is extracted in accordance with a frequency characteristic(namely, each direction at a boundary of the original image) based on the sub-frequency band.

The zero-tree coder 14 compresses and codes the inputted signal using an EZW(Embedded Zero-tree Wavelet) or a SPIHT(Set Partional In Hierarchical Tree) algorithm. Namely, the zero tree coder 14 defines the tree structure of the zero symbols for setting the root in which the position of the tree start is zero and setting the lower structure of the tree as zero for thereby compressing the images. At this time, the root of the zero tree is set to EOB(End of Block). The coefficients related to the same space positions in the original image are gathered and coded when the wavelet transformation coefficients are coded for thereby forming the zero tree structure. The number of nodes divided in the lower portions is increased in square proportion to the number of the previous nodes.

The operation of the motion compensation coding apparatus using the wavelet transformation according to the present invention will be explained.

Figure 4:
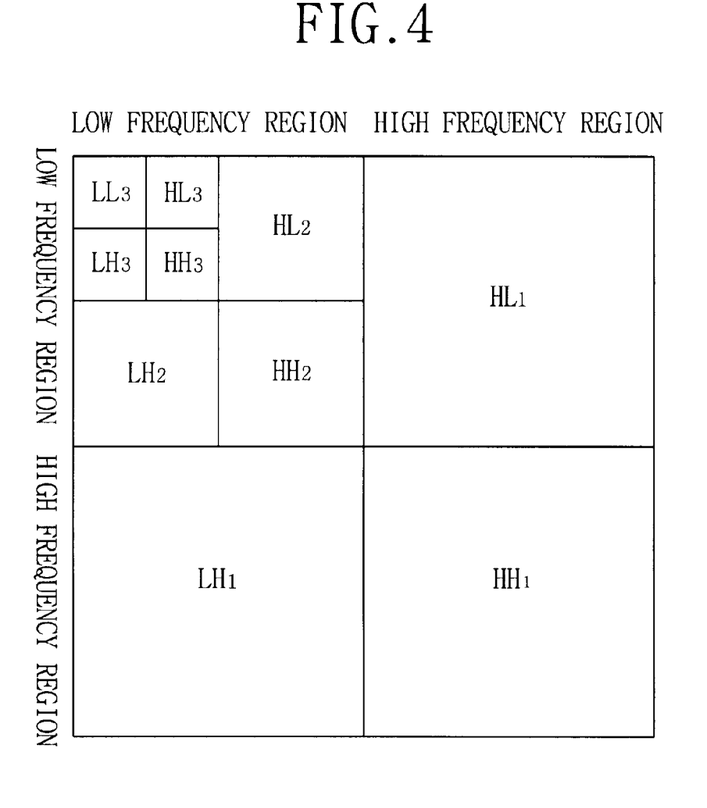
FIG. 4 is a view illustrating a sub-band structure obtained as a result of a wavelet transformation of a video signal according to the present invention.

As shown in FIG. 4, the wavelet transformed videos having a hierarchical structure outputted from the wavelet transformation unit 10 has a high frequency component when the level is low and has a low frequency component when the level is high. Namely, HL1 has a level of 1 and has a high frequency component in the vertical direction and a low frequency component in a horizontal direction. LH1 has a level of 1 and has a low frequency component in the vertical direction and a high frequency component in the horizontal direction. HH1 has a level of 1 and has a high frequency component in the diagonal direction of the image. LL1 is wavelet-transformed and has a level of 2 and is divided into regions HL1, LH2 and HH2 having the high and low frequencies in the horizontal and vertical directions. LL2 is divided into HL3, LH3, HH3 and LL3. The thusly divided regions are divided about the boundary region with respect to each direction.

The wavelet-transformed image has a statistical characteristic of the wavelet-transformed coefficient. In the low frequency band, if a certain coefficient is smaller than the critical value, it is not important with respect to the entire images. In addition, the coefficient corresponding to the same direction and position of the dissolved images is not important.

Therefore, when adapting the statistical characteristic to a result of the wavelet transformation coefficient, the zero tree coder 14 may form the inputted images in a zero tree type.

Figure 5:
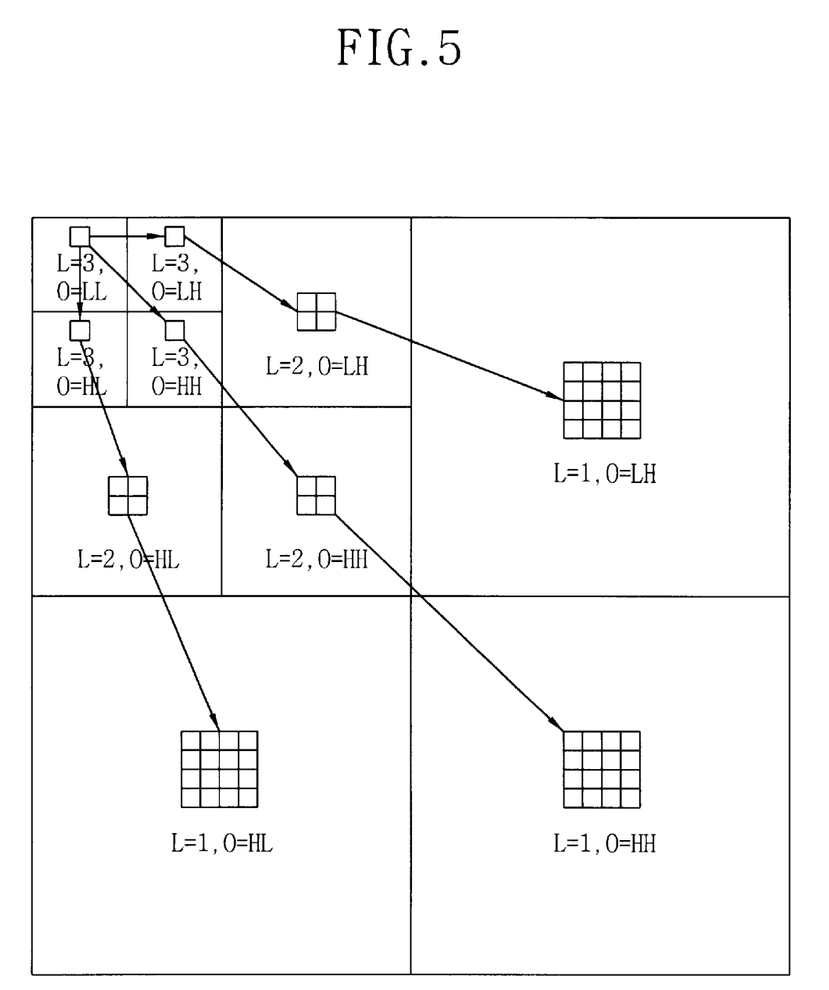
FIG. 5 is a view illustrating a zero-tree structure of a wavelet transformation coefficient according to the present invention.

FIG. 5 is a view illustrating the zero tree structure of the wavelet transformation coefficients and the wavelet-transformed images of each frequency (0=LH, HL, HH) with respect to each level (L=1,2,3). As shown therein, as the level is increased, a certain data corresponding to the region expressed in a grid is decreased. The tree structure is increased in square proportion. Therefore, much data are coded at one time. When the wavelet transformation coefficients are coded, the coefficients related to the space position are coded. The above-described operation will be explained in detail.

The wavelet transformation coefficients are divided into a dominant pass and a sub-ordinate pass. At the dominant pass, important coefficients are extracted based on each critical value, and at the sub-ordinate pass, the coefficients are aligned in the importance based on the size of the coefficients for thereby forming an embedded file. Namely, the image symbol used at the dominant pass may be expressed as Positive (POS), Negative (NEG), Isolated Zero Tree (IZT), Zero Tree Root (ZTR), Zero Tree Coefficient (ZTC). Among these symbols, POS and NEG are considered as the important symbols and are aligned at the sub-ordinate pass.

Since the image coding unit of the embedded file type has a characteristic capable of quickly stopping the coding and decoding operations, it is possible to implement an accurate compression rate. In addition, in order to obtain the above-described embedded characteristic, the values of the wavelet coefficients are coded, and the position data of the coefficient values are coded. In particular, in order to code the position data, much bits must be allocated.

Therefore, in order to effectively code the position data, since more coefficients of other data bits are coded, it is possible to compress the video data based on the coding rate higher compared to the conventional video data compression.

Figure 6:
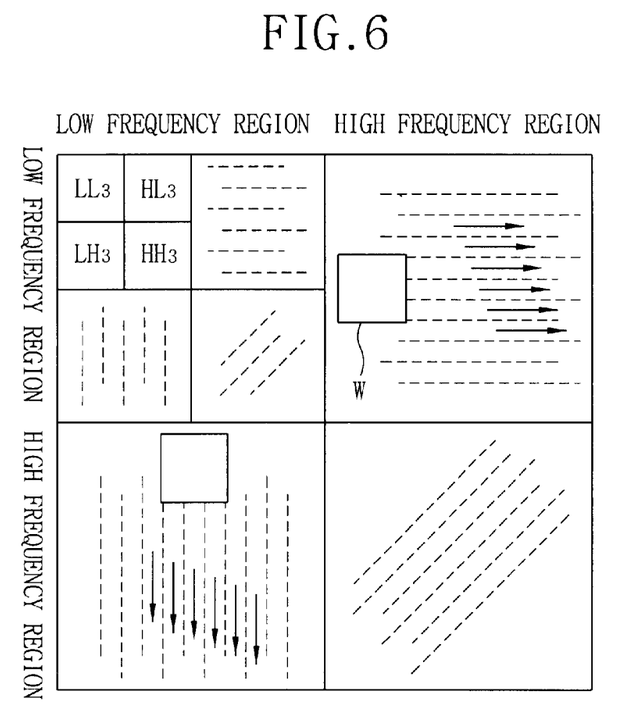
FIG. 6 is a view illustrating a direction pattern of a block search for extracting a motion vector according to the present invention.

FIG. 6 is a view illustrating the direction pattern of the block search for extracting the motion vector. The block motion estimator 20 represents a boundary of the region which is down-sampled twice as the level is higher. Therefore, in order to accurate express the contour of the boundary of the original image, the contour of the boundary of the HL and LH regions of the lowest level is scanned. Namely, the HL and LH regions of the lowest level are scanned in the horizontal and vertical directions for thereby searching the motion vector.

The size or window W of the block for searching the motion vector must have 64×64 bits for implementing the zero tree coding operation. Namely, since the size of the motion image used for a real time image communication is 160×120~320×240, and the resolving level of the image which is analyzed based on the size of the wavelet filter is 5~6, in the size of one pixel of the highest LL region, the size of the block of the lowest level is 32×32~64×64.

Therefore, the size W of the block for searching the motion vector must be 64×64 bits with respect to the motion image having a frame of a size of 320×320, so that the optimum coding operation using the zero tree structure is performed. In order to search the motion vector, when the size of the block is set as 64×64, the block motion estimator 20 compares the front and back frames of the motion image, and the motion vector is extracted based on the characteristics of the coefficients which represent the distribution of the boundary region in each direction after the wavelet transformation is performed.

The block which does not have a motion region is stored into the frame buffer 16 together with the wavelet-transformed image in accordance with a result obtaining by comparing the front and back frames of the image frame by the block motion estimator 20, and the block which has a motion region is outputted to the zero tree coder 14. At this time, when a motion block is searched along the boundary band at the HL and LH bands of the lowest level, the zero tree coder 14 codes a corresponding portion.

Namely, in the conventional art, only the block corresponding to the motion region is coded in the original image generated after the DCT transformation or in the original image in which a two-dimensional space overlap is not eliminated. In the present invention, the coefficients generated after the wavelet transformation are distributed based on each frequency band in a hierarchical structure, so that a corresponding motion block as well as the portion corresponding to the higher level are coded for thereby accurately recovering the images.

Figure 7:
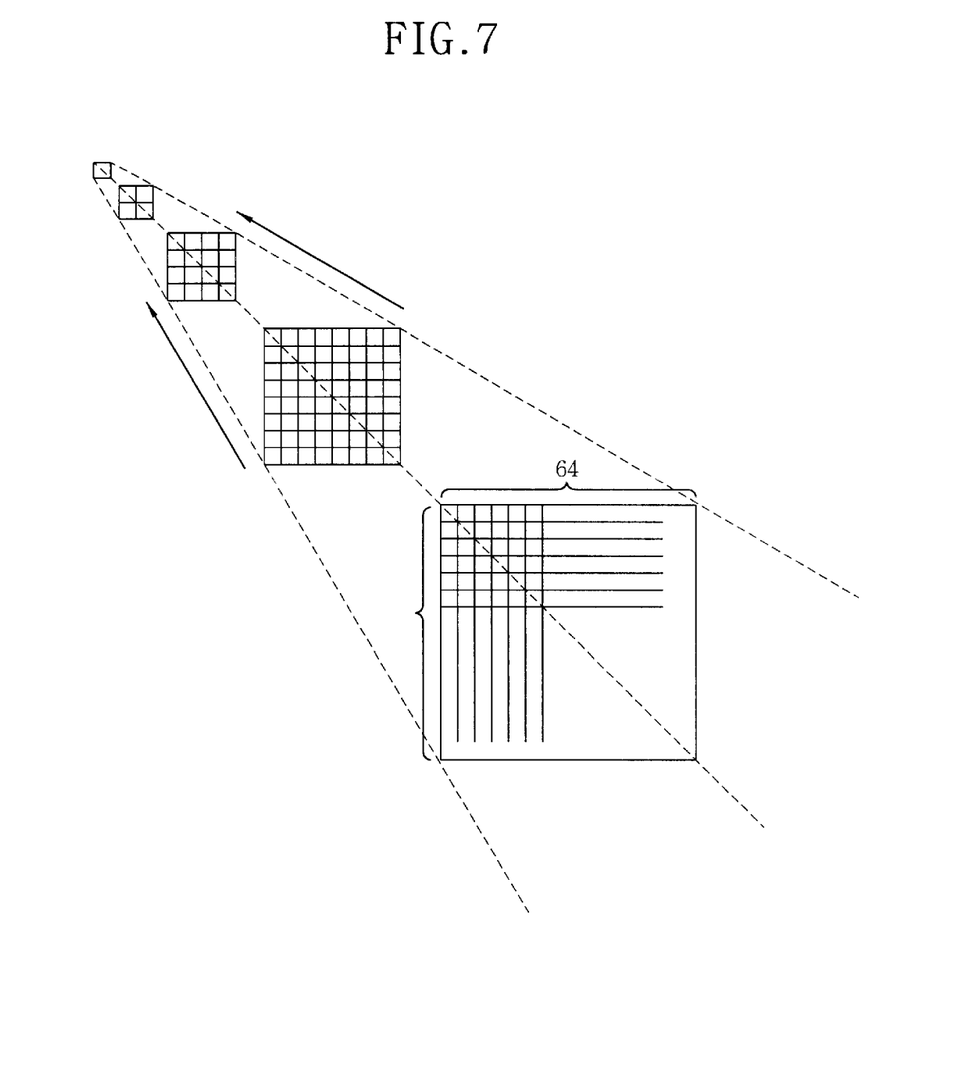
FIG. 7 is a view illustrating a zero-tree coding method for searching a root for generating a zero tree by adapting a wavelet hierarchical structure according to the present invention.

Therefore, The zero tree coder 14 searches the position of the unit block with respect to the unit block searched after the motion region is extracted based on a comparison of the front and back frames of the motion image by the block motion estimator 20. The position of the unit block is searched and is scanned in a certain direction reverse to the known zero tree structure for thereby searching the position of the highest band LL. As shown in FIG. 7, the above-described operation is performed based on the zero tree coding technique adapting the wavelet hierarchical structure.

FIG. 7 is a view illustrating the zero tree coding method for searching the root for forming the zero tree by adapting the wavelet hierarchical structure. One point of the searched highest band LL may be recognized as the highest level of the hierarchical structure, the above-described portion is coded based on the zero tree using the higher tree structure corresponding to the motion region of the lowest level.

As the above-described coding operation is performed, and the position data of the coded highest level pixel is transmitted, the data corresponding to the remaining regions (the data of the block which does not have the motion) are not transmitted. Therefore, since the zero tree coder 14 codes a corresponding motion block as well as a portion corresponding to the higher level, at the receiving side, a corresponding position is decoded using an additional position data, and the data of the binary frame is directly used with respect to the remaining data.

The entropy coder 18 which receives a zero tree-coded data of a corresponding region having a compensated motion region codes the zero tree coded data using the Hoffman method or the arithmetic coding method, and the data of the coded region are stored in the buffer 22. The buffer 22 outputs the coded data in a bit stream form in accordance with a control of the bit rate controller 12.

At the receiving side, the data of the motion region is received, and the data received at a corresponding position is decoded using the data coded for the zero tree structure and the wavelet coefficients of the higher level as a position data, and the remaining data(the data of the block which does not have the motion region) are recovered to the original image using the data of the previous frame.

Figure 8:
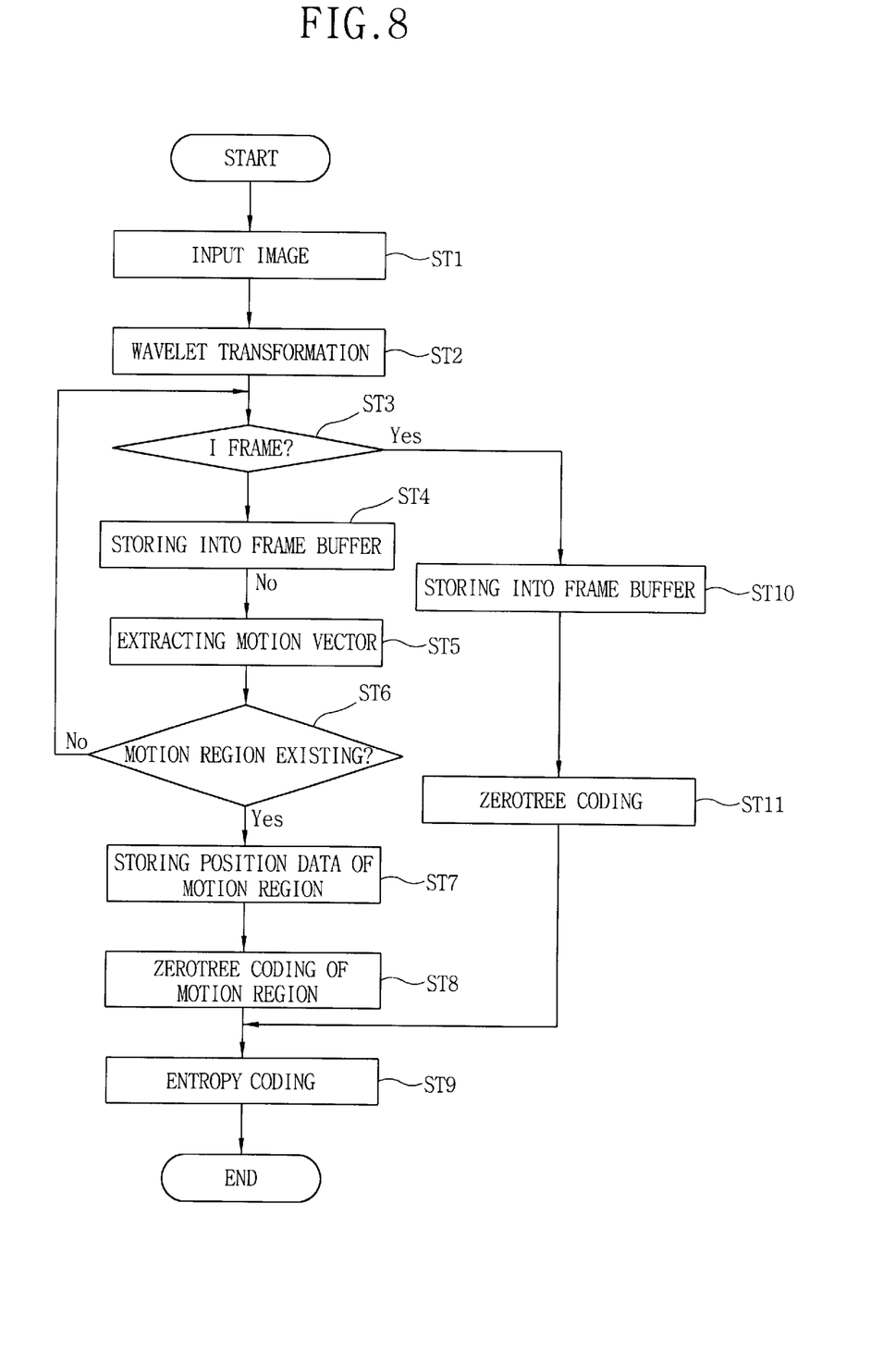
FIG. 8 is a flow chart of a compensation coding method using a wavelet transformation according to the present invention.

FIG. 8 is a flow chart of a motion compensation coding method using the wavelet transformation according to the present invention.

A motion image is received in Step ST1, and the frame of the motion image is wavelet-transformed in Step ST2. Thereafter, it is judged whether the wavelet transformed frame is I-frame (Intra frame) or not. As a result of the judgement, if the wavelet transformed frame is I-frame, the frames are stored into the frame buffer in ST10 and is processed based on the zero tree coding operation in Step ST11, and the entropy coding operation is performed with respect to the zero tree coded data in Step ST9.

As a result of the judgement, if the wavelet-transformed frame is not I-frame, the transformed frame represents Bi-directionally preditive-coded frame or Predictive-coded frame (B or P frames), and the B or P frames are stored into the frame buffer in Step ST4. Next, the motion vector is extracted from the stored B or P frames in Step ST5, and it is judged whether there is a motion region based on the motion vector in Step ST7. If there is not the motion region, it is judged whether the wavelet-transformed frame is I-frame in Step ST3. If there is the motion region, the position data corresponding to the motion region is stored in Step ST7, and the motion region is zero-tree-coded in Step ST8. Thereafter, the coded data are entropy-coded and transmitted in Step ST9.

Therefore, the frame which is motion-compensated at the B or P frame and is processed by the zero coding operation with respect to a corresponding region and the frame which is processed by the zero tree coding operation of the I frame are coded for transferring to the receiving side by the entropy coder which performs an entropy coding operation using the Hoffman method or the arithmetic coding method.

The image frames coded by the entropy coder is stored into the buffer and transferred to the receiving side, and at the receiving side, the images are recovered by the decoding operation which is performed reversely with respect to the coding operation.

In the motion compensation coding method according to the present invention, the I frame is judged with respect to the wavelet transformed data outputted to the wavelet transformation unit. However, the I frame may be judged with respect to the frame of the motion image inputted before the wavelet transformation is performed.

The motion compensation coding apparatus and method using the wavelet coding operation according to the present invention are capable of enhancing a compression rate of the motion images and decreasing the coding time. In addition, it is possible to enhance the resolution, and the present invention may be adapted to all multimedia applicable fields which use the motion images. In addition, the present invention may be easily adapted to a video conferencing communication and motion image video phone which need a real time process.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A motion compensation coding apparatus, comprising:
    a wavelet transformation unit for receiving a video signal and wavelet transforming by regions of different frequency bands based on a hierarchical structure; and
    a motion compensation unit receiving the wavelet-transformed images outputted from the wavelet transformation unit, storing the wavelet-transformed images into a frame buffer, extracting a motion vector in a direction of the boundary component which represents each direction in an original image and zero-tree-coding the wavelet-transformed images stored in the frame buffer and the extracted motion vector.
2. The apparatus of claim 1, wherein said motion compensation unit includes:
    a motion estimator for comparing the images outputted from the frame buffer, estimating a certain change or motion region in the images and outputting the motion vector corresponding to the motion region; and
    a zero tree coder for receiving the motion vector outputted from the motion estimator and the wavelet-transformed images outputted from the wavelet transformation unit and performing the zero tree coding operation thereon.

3. The apparatus of claim 2, wherein said zero tree coder codes the inputted video signals based on EZW (Embedded Zero-tree Wavelet) or a SPIHT(Set Partional In Hierarchical Tree) algorithms using a zero tree structure having a position data with respect to the motion region extracted by the motion estimator and a corresponding region of the motion region at the higher level of the level which includes the motion region.

4. The apparatus of claim 2, wherein said zero tree coder is a tree structure for setting to a root in which the lower structure of the tree is zero, and the position of the tree start is zero.

5. The apparatus of claim 4, wherein said zero tree gathers the wavelet transformation data related to the space position like the original image and codes the same and increase the structure in square proportion.

6. The apparatus of claim 2, further comprising a bit rate controller for controlling a quantization rate of the zero tree coder in accordance with a frame data included in the video signal and the amount of the video signal which will be transmitted to the receiving side.

7. The apparatus of claim 2, wherein said frame buffer stores the video signal by the unit of fields or frames.

8. The apparatus of claim 2, wherein the unit block size of the frame buffer is 64×64.

9. The apparatus of claim 1, further comprising an entropy coder for receiving the motion-compensated video signals outputted from the motion compensation unit for transferring to the receiving side and coding based on the Hoffman method or arithmetic coding method.

10. The apparatus of claim 9, further comprising a buffer for storing the video signals coded by the entropy coder.

11. A motion compensation coding method, comprising:

wavelet-transforming inputted images;

storing the wavelet-transformed images;

extracting a motion vector in a direction of a boundary component which represents the directions in an original image;

zero-tree-coding the stored wavelet-transformed images and the extracted motion vector; and entropy-coding in a form for transferring the zero-tree-coded image.

12. The method of claim 11, wherein said zero-tree-coding comprises:

judging whether the wavelet-transformed image is an I-frame, and when the wavelet-transformed image is an I-frame, storing the I-frame into a frame buffer and performing a zero tree coding operation on the stored I-frame;

storing the wavelet transformed image into the frame buffer when the wavelet-transformed image is not the I-frame; and extracting motion vectors from the wavelet-transformed image stored in the frame buffer and zero-tree-coding with respect to regions having motion based on the extracted motion vectors.

13. The method of claim 12 wherein in said steps for zero-tree-coding with respect to the region having the motion, a zero tree coding operation is performed using the position data of the motion region.

14. The method of claim 12 wherein said wavelet-transformed frame stored in the frame buffer is Bi-directionally coded-predictive frame or Predictive-coded frame (B- or P-frame).

15. A motion compensation coding apparatus, comprising:

a wavelet transformation unit for receiving a video signal and wavelet transforming by regions of different frequency bands based on a hierarchical structure;

a frame buffer for storing the wavelet-transformed image outputted from the wavelet transformation unit;

a motion estimator for comparing the images outputted from the frame buffer, estimating a certain change or motion region in the images and outputting the motion vector corresponding to the motion region, wherein the motion estimator compares the images stored in the frame buffer and extracts a motion vector in a direction of the boundary component which represents each direction in an original image; and a zero tree coder for receiving the motion vector outputted from the motion estimator and the wavelet-transformed images outputted from the wavelet transformation unit and performing a zero-tree-coding operation thereon.

* * * * *